July 1, 1924.

H. M. GODDEN

CONVEYER

Filed Jan. 17, 1923

1,499,920

INVENTOR.

Harry M Godden

BY

Van Evern Fish Hildreth Clary

ATTORNEYS

Patented July 1, 1924.

1,499,920

UNITED STATES PATENT OFFICE.

HARRY M. GODDEN, OF JAMAICA PLAIN, MASSACHUSETTS, ASSIGNOR TO NORFOLK IRON COMPANY, OF NORFOLK DOWNS, MASSACHUSETTS, A CORPORATION OF MASSACHUSETTS.

CONVEYER.

Application filed January 17, 1923. Serial No. 613,130.

*To all whom it may concern:*

Be it known that I, HARRY M. GODDEN, a citizen of the United States, residing at Jamaica Plain, in the county of Suffolk and State of Massachusetts, have invented certain new and useful Improvements in Conveyers; and I do hereby declare the following to be a full, clear, and exact description of the invention, such as will enable others skilled in the art to which it appertains to make and use the same.

The present invention relates to an improvement in conveyers.

The object of the invention is to reorganize and improve the construction of gravity conveyers used in factories, warehouses, shops and the like, for conveying articles from place to place therein, and the invention consists in the improvements hereinafter described and particularly defined in the claims.

Figure 3:
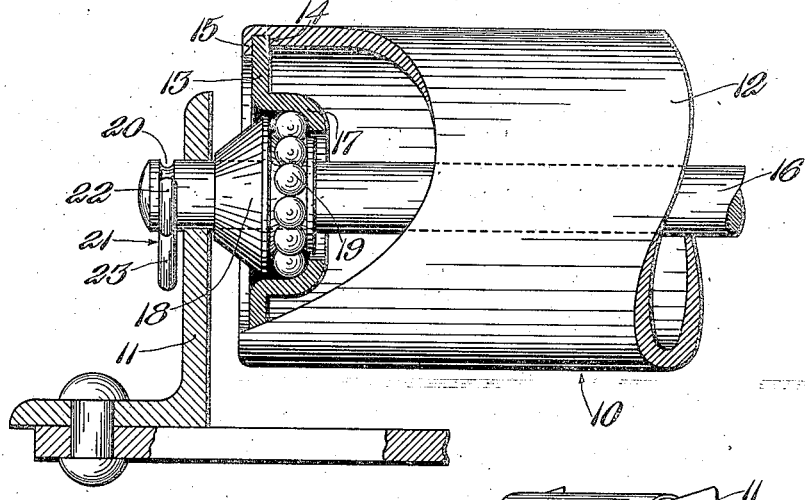
Figure 1:
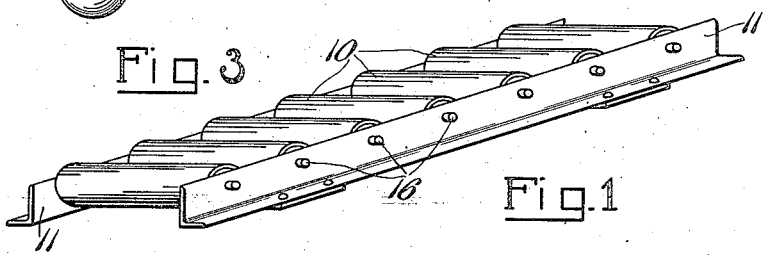
Figure 2:
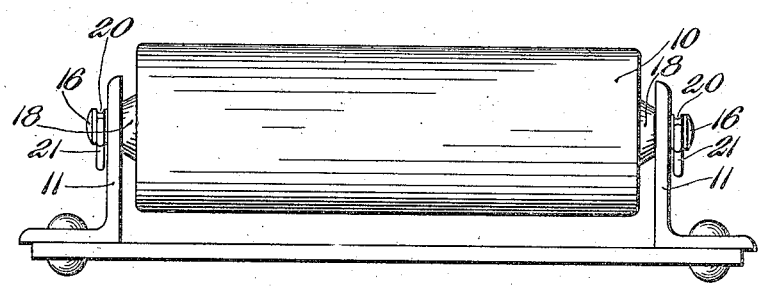
Figure 4:
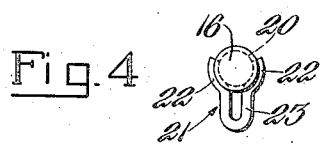

In the accompanying drawings illustrating the preferred form of the invention, Fig. 1 is a perspective view of a gravity conveyer embodying the present invention; Fig. 2 is an elevation of a conveyer roll and associated parts; Fig. 3 is an enlarged sectional longitudinal elevation of a roll support, illustrating the details of construction; and Fig. 4 is a detail hereinafter referred to.

The illustrated embodiment of the invention is described as follows: The conveyer consists of a series of rolls 10 rotatably mounted in a frame 11 shown as an angle iron, one member being located on each side of the conveyer and supporting the shafts or spindles upon which the rolls are mounted. The conveyer roll consists of a cold drawn seamless tube 12 in the end of which a recess is formed of the size of the flange of the bearing cup 13. This bearing cup is forced into the recess and bottoms against the shoulder 14. Then the roll end is spun or rolled down, as shown at 15, to form an inwardly extended flange which holds the roll head or cup in place in the end of the tube 12. The roll is mounted on a shaft 16 which extends from angle iron to angle iron across the length of the conveyer. The roll head is formed with the bearing cup or ball race 17, and the shaft carries an inner ball race or cone bearing 18. Between the outer and the inner ball race is carried the ball bearing 19. The inner bearing 18 is formed with a frusto-conical surface on the outside which tends to shed any dust or dirt or other thing which may lodge upon it and so deflect such dust or other thing away from the bearing, and tends to keep the bearing clean and in good working condition. The ends of the roll shaft 16 project through the flange of the angle iron 11 and are necked down at 20 to receive a lock clip 21 by which the shaft is held from escape through the angle irons. This lock clip has two circular segmental portions 22 united by a spring portion 23. By springing the segmental portions 22 over the shaft it is securely held in place thereon against the strains to which it might be subjected in holding the shaft in place. Heretofore cotter pins have been used for this purpose, but as the shaft sometimes rotates a person standing alongside of the conveyer is likely to have his clothes caught by the cotter pin and injured thereby. So this present construction contemplates a lock clip which has a smooth exterior surface not liable to catch on clothing or other things accidentally coming in contact with the end of the shaft. The lock clip is shown in Fig 4.

There are two features of especial importance embodied in this conveyer.

The first feature is the secure and perfect connection between the roll head and the roll. Heretofore it has been the practice to force the roll head in and then indent the roll to secure it in place, resulting in inaccuracies of position of the roll tube with respect to the roll head, causing the roll to wobble or gyrate. By forming the recess in the end of the roll and forcing the roll head into the recess, a correct and accurate positioning of the roll head in the roll is secured, and such positioning is maintained securely by spinning down the flange 15 over the edge of the roll head flange.

The second feature of importance in this conveyer resides in making the exterior portion of the inner ball race frusto-conical in form so as to shed dust, dirt or other things from the bearing and prevent their access thereto, thereby maintaining good operative conditions in the bearing.

Having thus described the invention, what is claimed is:

1. A conveyer roll consisting of a piece of cold drawn seamless tube formed with a shouldered recess in its end concentric with the outer surface thereof and of a diameter greater than the inside diameter of the tube, and a circular roll head having its peripheral portion of one thickness, laterally extended at right angles to the axis of the roll and fitting tightly and received within the recess, said roll head being securely maintained in the recess by a spun flange of the reduced portion of the tube beyond the head extending inwardly and engaging the outer surface of the head to secure the latter in place.

2. A conveyer roll consisting of a piece of cold drawn seamless tube having a roll head secured in its end provided with a central hole, a stationary shaft extending loosely through the hole in the roll head, said head being provided with a central ball race depression or cup formed concentrically with the outer surface of the edge of the roll head and the outer surface of the roll, an inner cone bearing fixed on the shaft, balls between the ball race in the head and the cone of the shaft, the depth of the ball race depression being greater than the diameter of the balls to permit the enlarged waist portion of the cone to enter and close the depression or cup in the roll head and the outer surface of the cone bearing being frusto-conical to shed dust, dirt or other things from the bearings.

HARRY M. GODDEN.